(12) United States Patent
Lin et al.

(10) Patent No.: US 7,206,549 B2
(45) Date of Patent: Apr. 17, 2007

(54) SYSTEM AND METHOD FOR TESTING WIRELESS DEVICES

(75) Inventors: Ching-Lang Lin, Hsinchu (TW);
Po-Kang Wang, Hsinchu (TW); I-Ru Liu, Taipei (TW)

(73) Assignee: Acradyan Technology Corporation, Hsinchu (TW)

( * ) Notice: Subject to any disclaimer, the term of this patent is extended or adjusted under 35 U.S.C. 154(b) by 96 days.

(21) Appl. No.: 11/176,365

(22) Filed: Jul. 8, 2005

(65) Prior Publication Data

US 2006/0012388 A1    Jan. 19, 2006

(30) Foreign Application Priority Data

Jul. 13, 2004  (TW) ............................... 93120835 A

(51) Int. Cl.
*H04Q 7/20* (2006.01)
*G01R 3/26* (2006.01)

(52) U.S. Cl. .................................. 455/67.11; 324/765
(58) Field of Classification Search .................... None
See application file for complete search history.

(56) References Cited

U.S. PATENT DOCUMENTS 5,144,642 A * 9/1992 Weinberg et al. ........... 375/228
6,822,947 B2 * 11/2004 Sawyer et al. .............. 370/328

* cited by examiner

*Primary Examiner*—Vinh Nguyen
*Assistant Examiner*—Trung Q. Nguyen
(74) *Attorney, Agent, or Firm*—Troxell Law Office, PLLC

(57) ABSTRACT

The present invention disclose a system and method for testing wireless devices, by which two wireless device-under-test (DUTs) is enabled to transmit and receive signal from each other such that the two DUTs can be test simultaneously for achieving the objects of reducing time consumed for testing a batch of DUTs and also reducing the amount of procedures required for cabling the DUTs to the test equipments of the test system.

24 Claims, 3 Drawing Sheets

SYSTEM AND METHOD FOR TESTING WIRELESS DEVICES

FIELD OF THE INVENTION

The present invention relates to a system and method for testing wireless devices, and more particularly, to a system and method capable of simultaneously testing two wireless devices.

BACKGROUND OF THE INVENTION

Wireless Local Area Network (WLAN) systems are growing very fast with the demand by the world wide wireless communication industry. As wireless local-area networks become more prevalent, you are likely to start testing the challenging semiconductor wireless devices that make WLAN possible. Wireless devices are complex, system-on-chip (SOC) devices that operate at high frequencies, but the price of these devices must be kept in line with consumer expectations; therefore, testing costs must be minimal. However, it is common for manufacturers of wireless devices, such as mobile phone, WLAN interface card, access point and so on, to perform their transmitter and receiver measurements by manually placing a wireless device in a anechoic chamber while cabling the output thereof to the test system, by which only one wireless device can be put in the anechoic chamber and be tested at a time. Therefore, it is time consuming to complete a batch test while there are many wireless devices waiting to be test since each wireless device is required to be connected to a plurality of testing equipments and put in the anechoic chamber manually after the previous-tested device had been disconnected and taken out. A solution to speed up the testing is by increasing the amount of the anechoic chamber so as to test more than one wireless device at a time. However, this solution will cause the increase of testing cost, that is, the solution can only be accomplished with more testing equipment and more man power for performing the testing. Hence, a highly efficient, rapid and low-cost test system and method is in great demand for manufacturers of wireless devices.

A typical test system today for wireless devices would include a plurality of test stations for measuring parameters of the transmitter and receiver thereof, e.g. maximal output power, minimal input power and Packet Error Rate (PER), etc. To test the receiver at the first test station, a golden radio selected from a Golden sample is being transmitted through the attenuator to the wireless device-under-test (DUT) to ensure it can detect the transmitted packets at specific power levels, which are set by the attenuator. The PC software as control unit accesses a register in the wireless DUT to count the received packets, so if the golden radio sends 1000 packets at the specific power level and 900 packets are recorded in the register as having been received, 10% of the packets obviously have been lost. For transmitter testing performed at the second test station, the wireless DUT is commanded to produce a signal on a particular channel. Output power is measured and viewed on a power-meter, and the signal's spectral characteristics are viewed on a spectrum analyzer. The goal is to ensure that the wireless device produces the required output power, on the right frequency, with an acceptable distortion level. From the above description, it is noted that only one wireless device can be put in the anechoic chamber and be tested at a time, in addition, it is required to manually cable the wireless device-under-test at each test station.

Hence, the present invention discloses a system and method capable of simultaneously testing two wireless devices, which not only can reduce test cost, but also have better testing efficiency.

SUMMARY OF THE INVENTION

It is the primary object of the invention to provide a system and method capable of simultaneously testing two wireless devices for increasing testing efficiency.

To achieve the above object, the present invention provides a test system comprising: a first wireless device-under-test, which is addressed as DUT #1; a second wireless device-under-test, which is addressed as DUT #2; a channel emulator; a signal monitor; two attenuators and two passage devices. The DUT #1 is used for providing a first transmitting signal to the channel emulator for enabling the same to generate a first testing signal with respect to the first transmitting signal and then transmit the first testing signal to the DUT #2. Each passage device have a first port, a second port and a third port, and one of the two passage devices has its first port coupled to the DUT #1, its second port coupled to the channel emulator and its third port coupled to the signal monitor while another passage device has its first port coupled to the DUT #2, its second port coupled to the channel emulator and its third port coupled to the signal monitor. One of the two attenuators is disposed between the DUT #1 and the corresponding passage device while another attenuator is disposed between the DUT #2 and another passage device corresponding to the DUT #2, such that respectively the RF powers of the first transmitting signal and the second transmitting signal can be tuned and reduced. The signal monitor is coupled to the DUT #1 and the DUT #2 for monitoring the first transmitting signal and the first testing signal.

To achieve the above object, the present invention provides a test method, comprising the steps of:
providing at least two device-under-test (DUT), a channel emulator and a signal monitor, whereas the channel emulator is coupled between the two DUTs and the signal monitor is coupled to the two DUTs;
providing a first transmitting signal to the channel emulator by one of the two DUTs addressed as DUT #1 for enabling the channel emulator to generate a first testing signal with respect to the first transmitting signal;
transmitting the first testing signal to be received by another DUT addressed as DUT #2;
analyzing the first transmitting signal and the first testing signal by the signal monitor;
providing a second transmitting signal to the channel emulator by the DUT #2 for enabling the channel emulator to generate a second testing signal with respect to the second transmitting signal;
transmitting the second testing signal to be received by the DUT #1; and
analyzing the second transmitting signal and the second testing signal by the signal monitor.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
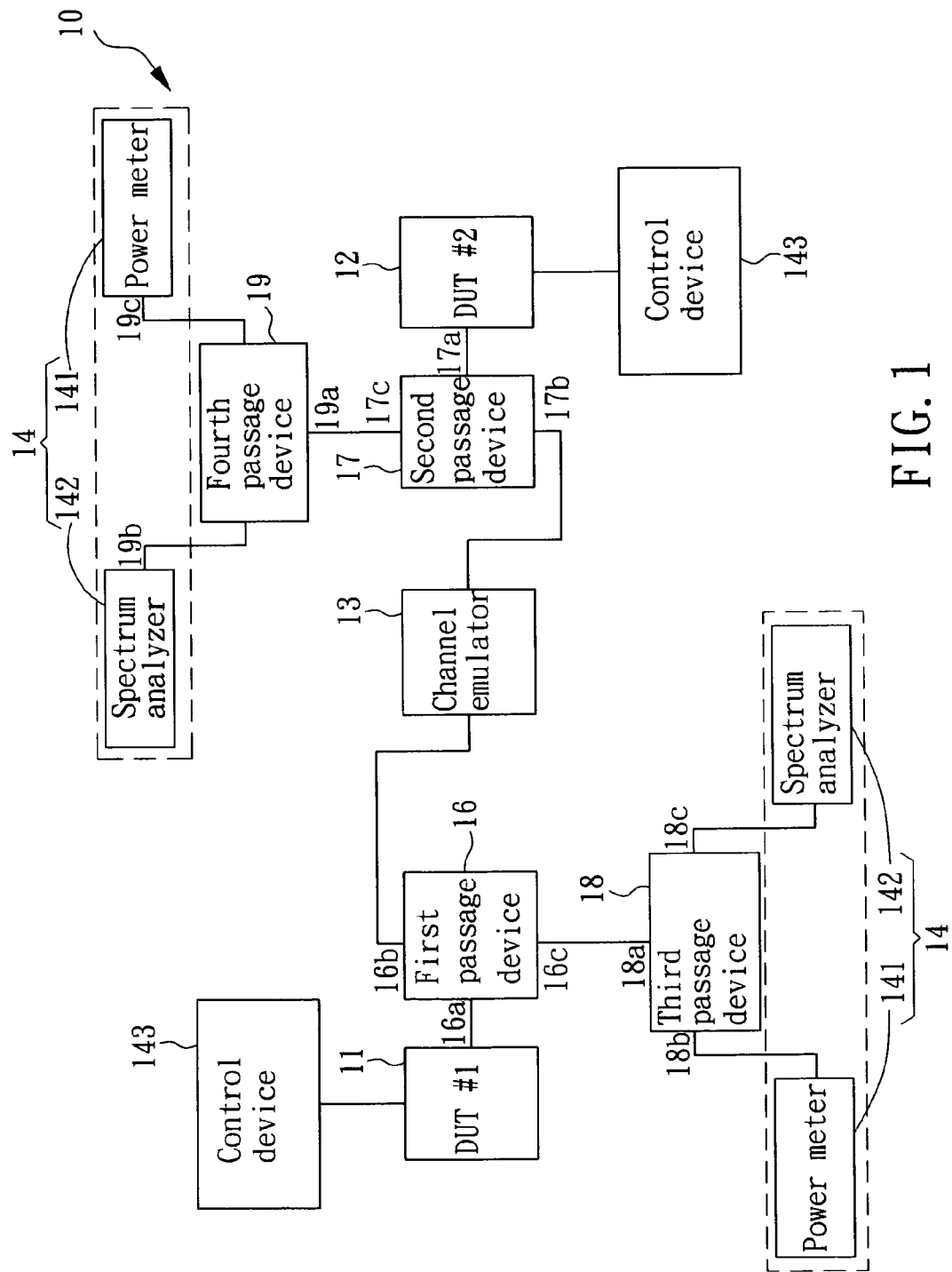
FIG. 1 is a schematic view of a test system according to a preferred embodiment of the invention.

Please refer to FIG. 1, which is a schematic view of a test system according to a preferred embodiment of the invention. The test system 10 comprises: a first wireless device-under-test 11, a second wireless device-under-test 12, a channel emulator 13, a first passage device 16, a second first passage device 17, a third first passage device 18, a fourth first passage device 19 and a signal monitor 14. The first wireless device-under-test 11 is coupled to the channel emulator 13 for providing a first transmitting signal to the channel emulator 13. The channel emulator 13 can generate a first testing signal with respect to the first transmitting signal while receiving the same. The second wireless device-under-test 12 is coupled to the channel emulator 13 for receiving the first testing signal and is also capable of providing a second transmitting signal to the channel emulator 13 for enabling the channel emulator 13 to generate a corresponding second testing signal. The signal monitor 14, comprising at least a power meter 141 and a spectrum analyzer 142, is couple respectively to the first wireless device-under-test 11 and the second wireless device-under-test 12 which is capable of monitoring and analyzing the first transmitting signal, the second transmitting signal, the first testing signal and the second testing signal. Moreover, the first passage device 16 is disposed between the first wireless device-under-test 11 and the channel emulator 13 while the second passage device 17 is disposed between the second wireless device-under-test 12 and the channel emulator 13.

Respectively, the first wireless device-under-test 11 and the second wireless device-under-test 12 can be a product selected from the group consisting of a WLAN card, an access point, a mobile phone and the like. Each of the four passage devices, i.e. the first, the second, the third and the fourth passage devices 16, 17, 18, 19, is a 3-port power divider having a first port a, a second port b and a third port c, where a signal can be received through the first port a and then be divided and transmitted out from the second port b and the third port c according to a specific ratio, or alternatively, a signal can be received through the first port b and then be divided and transmitted out from the second port a and the third port c. Wherein, the first port 16a of the first passage device 16 is coupled to the first wireless device-under-test 11 for receiving the first transmitting signal, the second port 16b of the first passage device 16 is coupled to the channel emulator 13, and the third port 16c of the first passage device 16 is coupled to the first port 18a of the third passage device 18, such that the signal monitor 14 can acquire two copies of the first transmitting signal of specific ratio respectively from the second port 18b and the third port 18c of the third passage device 18 for enabling the signal monitor 14 to perform a plurality of tests simultaneously.

As seen in FIG. 1, the third port 16c of the first passage device 16 is coupled to the first port 18a of the third passage device 18, the second port 18b of the third passage device 18 is coupled to a spectrum analyzer 142 and the third port 18c of the third passage device 18 is coupled to a power meter 141 such that the two units 141 and 142 are used for measuring and analyzing the center frequency, the power mask and the magnitude of power of the first transmitting signal transmitted from the first wireless device-under-test 11. The configuration of the second wireless device-under-test 12, the second and the fourth passage devices 17, 19 are similar to those of the first wireless device-under-test and the first and the third passage devices 16, 18, and thus will not be described further hereinafter. Moreover, Each of the four passage devices, i.e. the first, the second, the third and the fourth passage devices 16, 17, 18, 19, can be a 3-port coupler which is known to those skilled in the art and thus will not be described further hereinafter.

In a preferred embodiment, the channel emulator 13 is an attenuator that can tune and reduce the magnitude of signals transmitted therethrough for simulating the phenomenon of signal fading during transmission. It is noted that the loss of RF signal is proportional to the distance of transmission such that the use of attenuator, i.e. the channel emulator 13, can emulate the signal loss caused by distance without actually transmitting signals for a specific distance so as to perform a test. As the first transmitting signal provided by the first wireless device-under-test 11 is received by and pass the channel emulator 13, the first testing signal is generated. The signal monitor 14 coupling respectively to the first wireless device-under-test 11 and the second wireless device-under-test 12 is capable of measuring and analyzing the corresponding transmitting signals and testing signal therefrom. Various test equipments can be adopted as the signal monitor 14 with respect to the various test requirements and items, e.g. power meter and spectrum analyzer and the like. In the test system 10, a control device 143 such as a personal computer or a work station is connected to the first wireless device-under-test 11 and the second wireless device-under-test 12 in respective for controlling the transmitting and receiving of the same, in addition, the control device 143 is capable of executing related software for analyzing signals.

Figure 3:
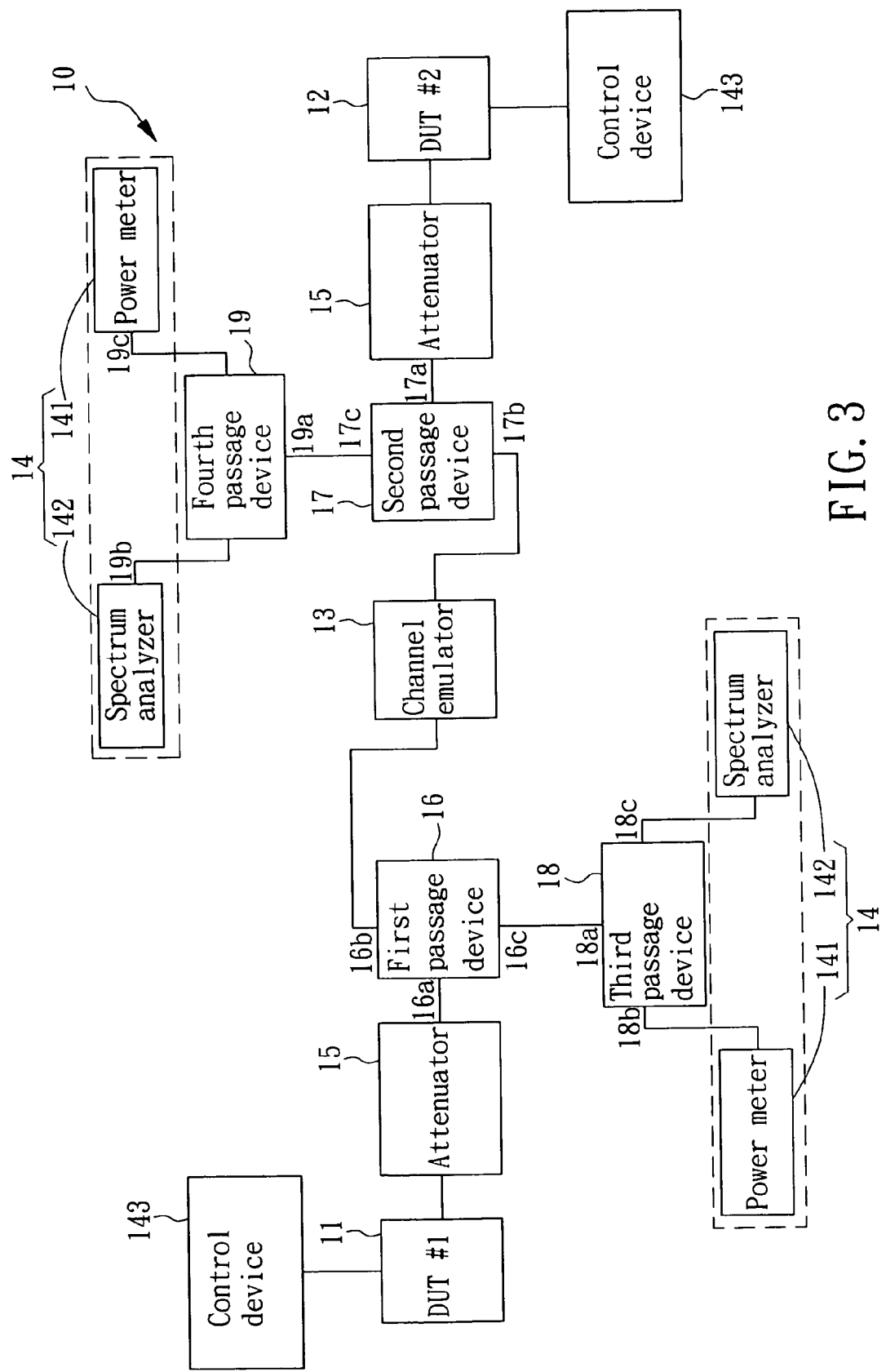
FIG. 3 is a schematic view of a test system according to another preferred embodiment of the invention.

In another preferred embodiment as seen in FIG. 3, an attenuator 15 is disposed between the first wireless device-under-test 11 and the first passage device 16 while another attenuator 15 is disposed between the second wireless device-under-test 12 and the second passage device 17, such that the powers of the first and the second transmitting signals provided respectively from the first wireless device-under-test 11 and the second wireless device-under-test 12 can be tuned and reduced so as to prevent the signal monitor 14 as well as the two wireless device-under-tests 11, 12 from being damaged by overloading.

Figure 2:
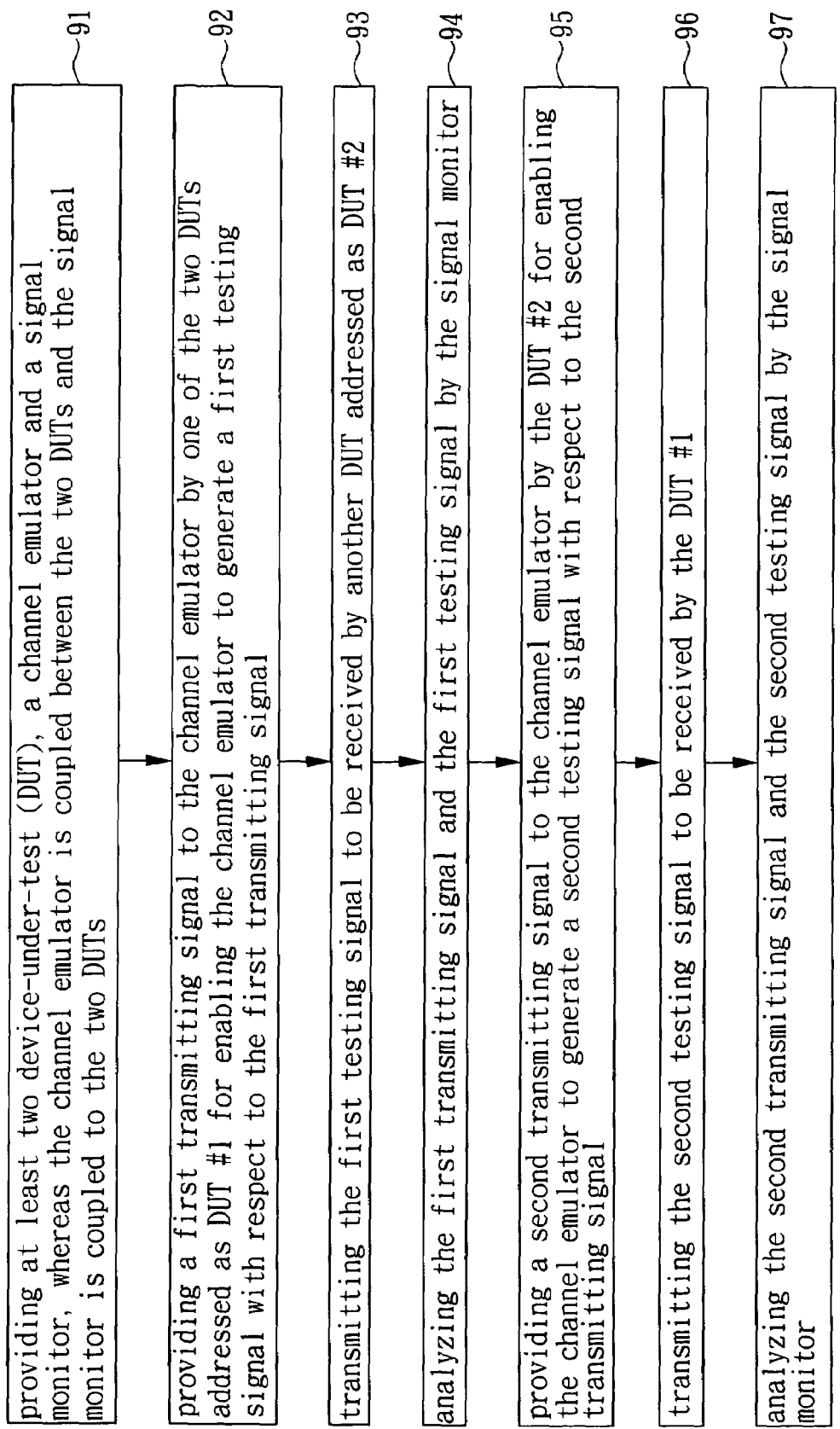
FIG. 2 is a flowchart of a test method according to a preferred embodiment of the invention.

Please refer to FIG. 2, which is a flowchart of a test method according to a preferred embodiment of the invention. As seen in FIG. 2, the test method of the present invention comprises the steps of:

step 91: providing at least two wireless device-under-test (DUT) 11, 12, a channel emulator 13 and a signal monitor 14, whereas the channel emulator 13 is coupled between the two wireless DUTs 11, 12 and the signal monitor 14 is coupled to the two wireless DUTs 11, 12;

step 92: providing a first transmitting signal to the channel emulator 13 by one of the two wireless DUTs addressed as DUT #1 11 for enabling the channel emulator 13 to generate a first testing signal with respect to the first transmitting signal;

step 93: transmitting the first testing signal to be received by another DUT addressed as DUT #2 12;

step 94: analyzing the first transmitting signal and the first testing signal by the signal monitor 14;

step 95: providing a second transmitting signal to the channel emulator 13 by the DUT #2 12 for enabling the channel emulator 13 to generate a second testing signal with respect to the second transmitting signal;

step 96: transmitting the second testing signal to be received by the DUT #1 11; and step 97: analyzing the second transmitting signal and the second testing signal by the signal monitor 14.

In step 91, the DUT #1 11 and the DUT #2 12 is cabled and configured according to the test system 10 shown in FIG. 1. The processes executed from the step 92 to the step 94 are used for testing the transmitter (Tx) of the DUT #1 11 and the receiver (Rx) of the DUT #2 12. That is, the DUT #1 11 provides and transmits a first transmitting signal to the channel emulator 13 by way of the first port 16a of the first passage device 16 and then the second port 16b of the same while a copy of the first transmitting signal of a specific ratio being transmitted out to the third passage device 18 from the third port 16c of the first passage device 16 is further being divided into copies of the first transmitting signal of a specific ratio to be received respectively by the spectrum analyzer 142 and the power meter 141 for measuring and analyzing the maximal output power, the center frequency, the power mask and the like of the first transmitting signal such that the function of the transmitter (Tx) of the DUT#1 11 is tested.

Moreover, after the first transmitting signal passes the channel emulator 13, a first testing signal is generated with respect to the first transmitting signal and is being transmitted to the DUT #2 12 such that the control device 143 can analyze the received first testing signal by executing a specific method like a software for analyzing signal quality so as to acquire information of minimal input power and PER of the DUT #2 12, that is, the receiver (Rx) of the DUT #2 12 is tested. In addition, the control device 143 also can execute a software for analyzing linkage quality so as to acquire the uplink throughput of the transmitter (Tx) of the DUT #1 11 and the downlink throughput of the receiver (Rx) of the DUT #2 12.

The processes executed from the step 95 to the step 97 are used for testing the transmitter (Tx) of the DUT #2 12 and the receiver (Rx) of the DUT #1 11. That is, the DUT #2 12 provides and transmits a second transmitting signal to the channel emulator 13 by way of the first port 17a of the second passage device 17 and then the second port 17b of the same while a copy of the second transmitting signal of a specific ratio being transmitted out to the fourth passage device 19 from the third port 17c of the second passage device 17 is further being divided into copies of the first transmitting signal of a specific ratio to be received respectively by the spectrum analyzer 142 and the power meter 141 for measuring and analyzing the maximal output power, the center frequency, the power mask and the like of the second transmitting signal such that the function of the transmitter (Tx) of the DUT #2 12 is tested.

Moreover, after the second transmitting signal passes the channel emulator 13, a second testing signal is generated with respect to the second transmitting signal and is being transmitted to the DUT #1 11 such that the control device 143 can analyze the received first testing signal by executing a specific method like a software for analyzing signal quality so as to acquire information of minimal input power and PER of the DUT #1 11, that is, the receiver (Rx) of the DUT #1 11 is tested. In addition, the control device 143 also can execute a software for analyzing linkage quality so as to acquire the uplink throughput of the transmitter (Tx) of the DUT #2 12 and the downlink throughput of the receiver (Rx) of the DUT #1 11.

From the above description, it is noted that the present invention discloses a system and method for testing wireless devices, by which two wireless device-under-test (DUTs) is enabled to transmit and receive signal from each other such that the two DUTs can be test simultaneously for achieving the objects of reducing time consumed for testing a batch of DUTs and also reducing the amount of procedures required for cabling the DUTs to the test equipments of the test system.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A test system of wireless devices, comprising:
   a first wireless device-under-test, for providing a first transmitting signal;
   a channel emulator, coupled to the first wireless device-under-test, for receiving the first transmitting signal and thus generating a first testing signal with respect to the first transmitting signal;
   a second wireless device-under-test, coupled to the channel emulator, for receiving the first testing signal; and
   a signal monitor, coupled to the first wireless device-under-test and the second wireless device-under-test, for monitoring the first transmitting signal and the first testing signal.

2. The test system of claim 1, further comprising:
   a first passage device, at least having a first port coupled to the first wireless device-under-test, a second port coupled to the channel emulator, and a third port coupled to the signal monitor;and
   a second passage device, at least having a first port coupled to the second wireless device-under-test, a second port coupled to the channel emulator, and a third port coupled to the signal monitor.

3. The test system of claim 2, wherein the third port of the first passage device is coupled to the first port of the second passage device.

4. The test system of claim 2, wherein both the first and the second passage devices are power dividers.

5. The test system of claim 2, wherein both the first and the second passage devices are couplers.

6. The test system of claim 2, wherein an attenuator is disposed between the first wireless device-under-test and the first passage device while another attenuator is disposed between the second wireless device-under-test and the second passage device.

7. The test system of claim 1, wherein the second wireless device-under-test is capable of providing a second transmitting signal to the channel emulator for enabling the same to generate a second testing signal corresponding to the second transmitting signal and transmit the second testing signal to the first wireless device-under-test.

8. The test system of claim 7, further comprising:
   a control device, coupled to the first wireless device-under-test, the second wireless device-under-test and the signal monitor, for controlling the generating of the first and the second transmitting signals and for monitoring and measuring the first and the second testing signals.

9. The test system of claim 1, wherein the channel emulator is an attenuator.

10. The test system of claim 1, wherein the signal monitor comprises a power meter.

11. The test system of claim 10, wherein the signal monitor further comprises a spectrum analyzer.

12. A test method of wireless devices, comprising the steps of:

provliding at least two wireless device-under-tests, a channel emulator and a signal monitor, whereas the channel emulator is coupled between the two wireless device-under-tests and the signal monitor is coupled to the two wireless device-under-tests;

providing a first transmitting signal to the channel emulator by one of the two wireless device-under-tests addressed as DUT #1 for enabling the channel emulator to generate a first testing signal with respect to the first transmitting signal;

transmitting the first testing signal to be received by another wireless device-under-test addressed as DUT #2;

analyzing the first transmitting signal and the first testing signal by the signal monitor;

providing a second transmitting signal to the channel emulator by the DUT #2 for enabling the channel emulator to generate a second testing signal with respect to the second transmitting signal;

transmitting the second testing signal to be received by the DUT #1; and analyzing the second transmitting signal and the second testing signal by the signal monitor.

13. The test method of claim 12, wherein the analyzing of the first transmitting signal and the first testing signal further comprises the step of:

measuring and analyzing the maximal output power of the DUT #1.

14. The test method of claim 13, wherein the analyzing of the first transmitting signal and the first testing signal further comprises the step of:

measuring and analyzing the minimal input power and Packet Error Rate of the DUT #2.

15. The test method of claim 12, wherein the analyzing of the second transmitting signal and the second testing signal further comprises the step of:

measuring and analyzing the maximal output power of the DUT #2.

16. The test method of claim 15, wherein the analyzing of the second transmitting signal and the second testing signal further comprises the step of:

measuring and analyzing the minimal input power and Packet Error Rate of the DUT #1.

17. The test method of claim 12, wherein the providing of the first transmitting single and the generating of the first testing signal further comprises the step of:

measuring and analyzing the throughput of the DUT #1.

18. The test method of claim 17, wherein the providing of the second transmitting single and the generating of the second testing signal further comprises the step of:

measuring and analyzing the throughput of the DUT #2.

19. The test method of claim 12, wherein the analyzing of the first transmitting signal and the first testing signal further comprises the step of:

measuring and analyzing the center frequency of the first transmitting signal.

20. The test method of claim 19, wherein the analyzing of the first transmitting signal and the first testing signal further comprises the step of:

measuring and analyzing the power mask of the first transmitting signal.

21. The test method of claim 20, wherein the analyzing of the first transmitting signal and the first testing signal is performed by using a spectrum analyzer to analyze the center frequency and power mask of the first transmitting signal.

22. The test method of claim 12, wherein the analyzing of the second transmitting signal and the second testing signal further comprises the step of:

measuring and analyzing the center frequency of the second transmitting signal.

23. The test method of claim 22, wherein the analyzing of the second transmitting signal and the second testing signal further comprises the step of:

measuring and analyzing the power mask of the second transmitting signal.

24. The test method of claim 23, wherein the analyzing of the second transmitting signal and the second testing signal is performed by using a spectrum analyzer to analyze the center frequency and power mask of the second transmitting signal.

* * * * *